United States Patent [19]

St. Clair

[11] Patent Number: 5,789,025
[45] Date of Patent: Aug. 4, 1998

[54] FIRE RESISTANT, MOISTURE BARRIER MEMBRANE

[75] Inventor: Terry L. St. Clair, Poquoson, Va.

[73] Assignee: The United States of America as represented by the Administrator of the National Aeronautics and Space Administration, Washington, D.C.

[21] Appl. No.: 772,052

[22] Filed: Dec. 9, 1996

Related U.S. Application Data

[60] Provisional application No. 60/008,765 Dec. 15, 1995.
[51] Int. Cl.⁶ .................................................... B05D 5/00
[52] U.S. Cl. ....................... 427/245; 427/246; 427/387
[58] Field of Search ................................ 427/245, 246, 427/387

[56] References Cited

U.S. PATENT DOCUMENTS

| | | | |
|---|---|---|---|
| 4,499,149 | 2/1985 | Berger | 428/447 |
| 4,980,235 | 12/1990 | Scheer et al. | 427/245 |

*Primary Examiner*—Janyce Bell
*Attorney, Agent, or Firm*—George F. Helfrich

[57] ABSTRACT

A waterproof and breathable, fire-resistant laminate is provided for use in tents, garments, shoes, and covers, especially in industrial, military and emergency situations. The laminate permits water vapor evaporation while simultaneously preventing liquid water penetration. Further, the laminate is fire-resistant and significantly reduces the danger of toxic compound production when exposed to flame or other high heat source. The laminate may be applied to a variety of substrates and is comprised of a silicone rubber and plurality of fire-resistant, inherently thermally-stable polyimide particles.

13 Claims, No Drawings

FIRE RESISTANT, MOISTURE BARRIER MEMBRANE

ORIGIN OF THE INVENTION

The invention described herein was made by a NASA employee and may be manufactured or used by or for the Government for governmental purposes without the payment of any royalties thereon or therefor.

This application claims the benefit of U.S. Provisional Application Ser. No.: 60/008,765 filing date Dec. 15, 1995.

BACKGROUND OF THE INVENTION

1. Field of the Invention

The present invention relates generally to waterproof/breathable ("WPB") fabric coatings and laminates. More specifically, the present invention relates to fire-resistant, WPB fabric coatings and laminates which minimize the risk of toxic compound production when exposed to flame or other high heat source.

2. Description of the Related Art

The markets for and uses of waterproof/breathable ("WPB") fabrics have greatly expanded since the development of Gore-Tex® and similar laminates. The advantages of WPB fabrics is their ability simultaneously to repel liquid water (waterproof) and permit the passage of water vapor (breathable). In practical terms, one wearing a WPB rain garment in inclement weather, even while exercising, would stay dry because the rain is kept out but perspiration evaporates away. This is a great improvement over fabrics which are waterproof but not breathable (e.g. polyurethane coated fabrics or polyvinyl chloride films) or breathable but not waterproof (e.g. cotton). The application of silicone or fluorocarbon or other water repellant to a breathable fabric (e.g. cotton) might provide some minimal water repellency, but falls far short of the performance of WPB fabrics.

Hydrophobic membranes are ideal candidates for use in WPB fabrics. The hydrophobic membrane contains very small pores that resist the entry of liquid water even at substantial pressures or when rubbed or flexed, but readily allow the flow of gases like water vapor. This is to be contrasted with wicking materials. Wicking materials are hydrophilic and porous with pores that interconnect to make complete pathways through the material. Liquid water moves through these materials by capillary action. While wicking materials easily transport water and water vapor from an internal to an external side, they offer no resistance to the entry of liquid water. Gore describes the use of hydrophobic layers in WPB fabrics in U.S. Pat. No. 3,953,566.

An example of a membrane for a WPB fabric is detailed in Gore et al., U.S. Pat. No. 4,194,041, where the membrane is a microporous polytetrafluoroethylene ("PTFE") laminate that possesses a high moisture vapor transmission rate even under adverse climatic conditions. This invention comprises a first layer of hydrophobic material attached to a second layer of hydrophilic material. A waterproof/breathable fabric is constructed by attaching this membrane to a suitable base fabric such as nylon taffeta. The hydrophobic layer prevents the entry of liquid water into the fabric, while the hydrophilic layer draws the interior moisture to the membrane so that it might evaporate through. Importantly, the hydrophilic layer also serves to prevent oils and contaminates in perspiration from entering the hydrophobic layer, coating its interior surfaces, and greatly reducing its ability to repel water. The Gore-Tex® membrane is available commercially from W. L. Gore & Associates, Inc.

Performance fabric technology incorporating WPB membranes has continued to advance rapidly. Gohlke, U.S. Pat. No. 4,344,999, developed a breathable laminate that serves as a bacteria barrier for hospital applications. Worden details a process for making stretchable Gore-Tex® membranes in U.S. Pat. No. 4,443,511. An anti-static WPB fabric for covering aerospace equipment was described by Saville et al. in U.S. Pat. No. 4,816,328. In U.S. Pat. No. 4, 868,928, Norvell described a stretchable WPB garment for active outdoor gear. An improved Gore-Tex® membrane allowing for a greater water vapor transmission rate was described by Henn in U.S. Pat. No. 4,969,998. Wu, in U.S. Pat. No. 5,242,747, describes the use of oleophobic material in a WPB membrane to prevent damage and clogging from oils.

Generally speaking, there are two types of performance fabrics which exhibit WPB and windproof qualities: laminates and coated fabrics. Coated fabrics are created by applying rubber, PVC, polyurethane, ceramic or amino acid compounds to a fabric with a spray or bath or other method. In contrast, laminates are produced by sticking one or more membranes to a fabric via heat sealing or adhesives.

The Gore-Tex® membrane is generally laminated to a high performance fabric to create a laminated fabric. Some constructions even sandwich the Gore-Tex® membrane between two fabrics for additional comfort in wearing as personal garment. In general, these laminated fabrics are able to withstand very high water pressure (up to 65 psi) with minimal leakage, but "breathe" as water vapor passes through the fabric/ membrane away from the body. This feature is due to the billions of microscopic pores in the membrane which are small enough to restrict water droplets but large enough to allow water vapor passage. One common Gore-Tex® membrane is a composite of a hydrophobic (water-hating) material into which is integrated an oleophobic (oil-hating) substance. The hydrophobic material prevents water droplets from penetrating the fabric. While allowing moisture vapor to pass through, the oleophobic material prevents penetration of contaminates like oils, insect repellents, and food.

Such a membrane is comprised of a rubbery or elastomeric binder (hydrophobic) and a polymeric filler of micron-sized particles (oleophobic). Alone, the rubbery material blocks the penetration of water; minuscule pathways are created by the addition of the polymer which allow for the passage of water vapor. The resulting membrane is ideal for use in WPB fabrics.

However, a significant problem arises with these WPB laminates. They often employ natural or synthetic rubbers in combination with a fluorinated polymer, e.g. Teflon®. When exposed to a high heat source or flame, the rubbery portion of this combination can burn and generate toxic by-products. The fluorocarbons also have the tendency to decompose in fire to produce toxic compounds.

Some have attempted to make WPB fabrics fire-resistant by applying a flame-retardant composition to the fabric (see U.S. Pat. No. 4,223,066). This method is deficient because of the tendency of the surface coatings to wash off during cleaning. Sun, in U.S. Pat. No. 5,418,054, details a fire-resistant WPB laminate comprised of two layers of expanded PTFE sealed together with a phosphorous-containing poly(urea-urethane) adhesive. While retaining its fire-resistant qualities even through cleaning or laundering, this invention does not address the danger of toxic compound production.

There is an ever present need for new, improved WPB laminates for high performance fabrics which are fire resistant and either do not present or significantly reduce the danger of toxic compound production. In particular, there is a need for such WPB laminates for fabrics to be used in industrial, military, commercial and emergency situations. Specifically, military tents and gear and shoes, airplane seat covers, clothing for fire-fighters or industrial workers exposed to high heat sources, and commercial fabrics for tents or roofs require waterproof, breatheable, fire-resistant and safety qualities. Laminates in the available art have been unable to provide the improved fire-resistant and safety features required by the described applications.

SUMMARY OF THE INVENTION

It is accordingly the primary object of the present invention to provide what the prior art has been unable to provide, viz., an improved laminate for use in WPB, high performance fabrics which is fire resistant and significantly reduces the danger of toxic compound production when exposed to flame or other high heat source. It is a further object to provide a laminate readily applied to fabrics for use in garments, tents, covers, and shoes.

The primary object and other objects and benefits are achieved by the present invention, a waterproof and breathable, fire-resistant laminate comprised of a silicon rubber and a polyimide powder, the polyimide powder comprising a plurality of polyimide particles. The particles are suspended in the silicone rubber so that a plurality of pathways are created through the laminate which allow the passage of water vapor molecules but not liquid water. The laminate is formed by applying a slurry of a silicone precursor and the polyimide powder to a fabric or other suitable material, and concurrently or sequentially setting the laminate thermally or with a catalyst or with moisture, depending on the nature of the silicone precursor. Once the laminate has been "set," i.e. the slurry has been polymerized to a rubbery material, it will prevent liquid water from passing through the fabric but will allow the transmission of water vapor.

The silicone rubber is formed from a silicone precursor such as a dimethylsilicone fluid terminated with reactive end groups, where the reactive end groups cause molecular growth to polymer form via standard chemical techniques. The dimethylsilicone fluid with reactive end groups is represented as

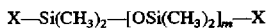

where m=5–1000, and X is equal to one of the group comprising a mixture of —CH═CH$_2$ and —H, —OCOCH$_3$, or —OCH$_3$.

The polyimide powder comprises of a plurality of polyimide particles. The particles may be approximately round and may be of approximately the same diameter, but need not be. Irregularly shaped and/or sized particles may be used. Particles of an oblong shape or an approximately rectangular shape, e.g. produced from chopped polyimide fibers, may yield beneficial results. In fact, better results may be achieved with particles exhibiting higher aspect ratios.

The polyimide powder must be of a fire-resistant, inherently thermally-stable polyimide. It is preferable to use a fire-resistant, inherently thermally-stable, linear aromatic polyimide. Beneficial results are achieved from using polyimide powder LARC™-IA. The chemical structure of LARC™-IA is illustrated below:

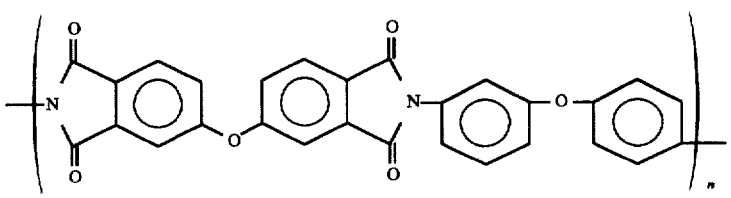

where n=10–100.

The particles of the polyimide powder should be micron-sized, measuring approximately 1–20 μm in size. The loading level of the powder should be between 20–60% by volume.

The polyimide powder is physically blended into the silicone precursor to form the slurry. Once the slurry has been set to form a silicone rubber membrane, the polyimide particles, suspended therein, serve to create chemical and physical pathways through which water vapor molecules are able to pass. As a result, the waterproof/breathable qualities are achieved.

The process for producing the laminate of the present invention is more fully described in the below section.

Beneficial results are achieved where the WPB, fire-resistant laminate comprises a silicone rubber and a polyimide powder, the polyimide powder comprising a plurality of fire-resistant, inherently thermally-stable, linear aromatic polyimide particles, where the polyimide is LARC-IA™. The polyimide particles used are of variable shape and size, where the size is between 1–20 μm, and the particles have a high aspect ratio. The loading level of the powder is approximately 30%. The silicone rubber is formed from a silicone rubber precursor, where the silicone rubber precursor is a dimethylsilicone fluid with reactive end groups represented as

where m=5–1000, and X is equal to an equimolar mixture of —CH=CH$_2$ and —H.

A slurry is formed from the silicone rubber precursor and the polyimide particles. To the slurry, a platinum catalyst is added to set the silicone rubber. The slurry is soon thereafter applied to the substrate, e.g. nylon taffeta, by the process of doctoring to form a membrane of average thickness between 0.0002 and 0.002 inches on the substrate.

DESCRIPTION OF THE PREFERRED EMBODIMENTS

The laminate of the present invention can be produced as described below. A polyimide powder is physically blended into silicone precursor, namely a dimethyl-silicone fluid terminated in reactive end groups, to form a slurry. The slurry can be applied to a fabric, cloth or other suitable substrate via a variety of techniques including brushing, calendering, rolling, doctoring, or silk screening. The application of the slurry to the cloth, or other substrate, should afford a liquid membrane of a thickness in the range of approximately 0.0002 to 0.002 inches. After application, the slurry coating is set, polymerized to form the rubbery membrane, with either moisture or heat or a catalyst. The method of setting depends on the nature of the silicone precursor. Polyimide powder, e.g. LARC™-IA, of a size approximately 1–20 µm in diameter is physically blended into the silicone precursor to a loading level of 20–60% by volume.

The silicone precursor, a dimethylsilicone fluid with reactive end groups, is represented as

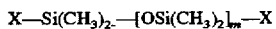

where m=5–1000, and X is equal to one of the group comprising a mixture of —CH=CH$_2$ and —H, —OCOCH$_3$, or —OCH$_3$. Where the reactive end groups, X, of the dimethylsilicone fluid are a mixture of —CH=CH$_2$ and —H, and in near equimolar amounts, the slurry is treated with a platinum catalyst to set the slurry to rubbery polymer form. No volatiles are generated in this process. Where a catalyst is used to set the slurry, it may be added to the slurry immediately prior to application, for convenience. In addition, heat may be used to aid in the application of the slurry to the substrate.

Where the reactive end groups, X, are —OCOCH$_3$ or —OCH$_3$, the slurry is treated with water in the form of moist air to set the slurry to rubbery polymer form. The moisture in the air causes a loss of acetic acid or methanol, respectively, resulting molecular chain growth and thereby setting the silicone precursor.

After setting, the suspended polyimide powder is trapped in the rubbery membrane and laminated to the cloth or substrate. The suspended particle help create pathways for water vapor molecules to exit through the membrane. An additional advantage of the silicon rubber is that the interatomic distance between the silicon and oxygen atoms is such that energetic water molecules (water vapor) can readily pass through. This stands in contrast to carbon-based rubber.

A fire-resistant, inherently thermally stable, linear aromatic polyimide powder, like LARC™-IA, when suspended in a rubbery silicone membrane, serves to significantly reduce the overall combustion potential of the cloth or substrate onto which it has been applied. In addition, the potential for generating toxic combustion by-products when exposed to a flame or high heat source is significantly reduced due to the inherently non-flammable nature of the polyimide/silicone mixture.

EXAMPLES

Example 1

The following description details the preparation of a fire-resistant, moisture-proof membrane to a substrate for use in WPB fabrics.

A silicone polymer mixture was prepared by blending a silicone, Dow Corning Fabric Coating #61 ("#61") having a viscosity of 500 cp, with powdered LARC-IA™, in proportions of 70% and 30% by weight respectively. A swatch of fabric was pretreated by spray-coating a thin layer of #61 on the fabric. The mixture was applied to the pre-treated fabric using a contact printing method. A 40 mesh nylon screen was employed. Several passes using a squeegee, 14"/60 durometer, were made to yield a substantial membrane.

Example 2

The following description details the preparation of a fire-resistant, moisture-proof membrane to a substrate for use in WPB fabrics.

A silicone polymer mixture was prepared by blending a silicone, Dow Corning Fabric Coating #61 ("#61") having a viscosity of 500 cp, with powdered LARC-IA™, in proportions of 80% and 20% by weight respectively. A swatch of fabric was pretreated by spray-coating a thin layer of #61 on the fabric. The silicone rubber was set with recommended catalyst from Dow Corning. The mixture was applied to the pre-treated fabric using a an off-contact printing method. A 40 mesh nylon screen was employed. One pass with the squeegee was made to yield a substantial membrane.

Example 3

The following description details the preparation of a fire-resistant, moisture-proof membrane to a substrate for use in WPB fabrics.

A silicone polymer mixture was prepared by blending a silicone, Dow Corning Fabric Coating #60 ("#60") having a viscosity of 40,000 cp, with powdered LARC-IA™, in proportions of 80% and 20% by weight respectively. A swatch of fabric was pretreated by spray-coating a thin layer of #61 on the fabric. The silicone rubber was set with recommended catalyst from Dow Corning. The mixture was applied to the pre-treated fabric using a an off-contact printing method. A 40 mesh nylon screen was employed. One pass with the squeegee was made to yield a substantial membrane.

Further beneficial results are achieved where the coated fabric is sandwiched between plastic sheeting and pressure applied, e.g. via a hydraulic press, while the silicone rubber cures. Upon curing, the plastic sheeting is removed to yield the membrane securely adhered to the underlying fabric.

The embodiments discussed herein were designed and/or tested using standard means.

The present invention has been described in detail with respect to certain preferred embodiments thereof. However, as is understood by those skilled in the art, variations and modifications in this detail can be made without any departure from the spirit and scope of the present invention as defined in the hereto-appended claims.

What is claimed is:

1. A process of producing a waterproof, breatheable, fire-resistant laminate by coating a substrate with a membrane, comprising the following sequence of steps:
   (a) blending a silicone rubber precursor and a polyimide powder into a slurry, the polyimide powder comprised of a fire-resistant, inherently thermally-stable polyimide, where the polyimide powder is comprised of a plurality of particles;
   (b) applying the slurry to a substrate so as to form a thin layer of slurry on and in the substrate; and
   (c) setting the slurry layer by inducing the polymerization of the silicone rubber precursor to form a membrane of silicone rubber, so that the silicone rubber membrane is continuous and is connected with and adheres to the substrate, so that the particles of polyimide powder are suspended within the silicone rubber membrane, so that the suspended particles create or help create multiple pathways through the silicone rubber membrane, where the pathways are large enough for a water vapor molecule to travel through but are not so large as to allow liquid water to travel through, so that the silicone rubber membrane repels liquid water but allows water vapor to pass through, and so that the silicone rubber membrane with suspended polyimide powder is resistant to burning.

2. The process of claim 1, wherein the silicone rubber precursor is a dimethylsilicone fluid with reactive end groups as shown below:

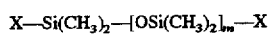

where m=5–1000, and where X is a reactive end group selected from the group consisting of a mixture of —CH=CH$_2$ and —H, —OCOCH$_3$, or —OCH$_3$.

3. The process of claim 2, wherein the reactive end groups, X, are an equimolar mixture of —CH=CH$_2$ and —H.

4. The process of claim 3, wherein the setting of the silicone rubber precursor is accomplished by treating the slurry layer with a platinum catalyst.

5. The process of claim 2, wherein the reactive end groups, X, are —OCOCH$_3$.

6. The process of claim 5, wherein the setting of the silicone rubber precursor is accomplished by treating the slurry layer with water in the form of moist air.

7. The process of claim 2, wherein the reactive end groups, X, are —OCH$_3$.

8. The process of claim 7, wherein the setting of the silicone rubber precursor is accomplished by treating the slurry layer with water in the form of moist air.

9. The process of claim 1, wherein the polyimide powder is comprised of a fire-resistant, inherently thermally-stable, linear aromatic polyimide powder.

10. The process of claim 9, wherein the polyimide powder has the chemical structure represented below:

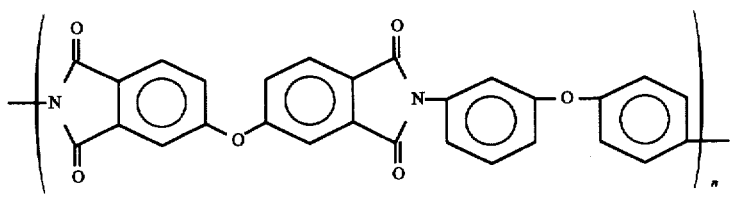

where n=10–100.

11. The process of claim 10, wherein the particles of polyimide powder are round and are approximately between 1–20 μm in diameter.

12. The process of claim 1, wherein the substrate is a substrate selected from the group consisting of cotton cloth and nylon taffeta.

13. The process of claim 1, wherein the layer of slurry has a thickness of approximately 0.0002 and 0.002 inches.

* * * * *